March 25, 1924.
P. F. MARTUS
HOT HANDLE GRIP
Filed April 14, 1922
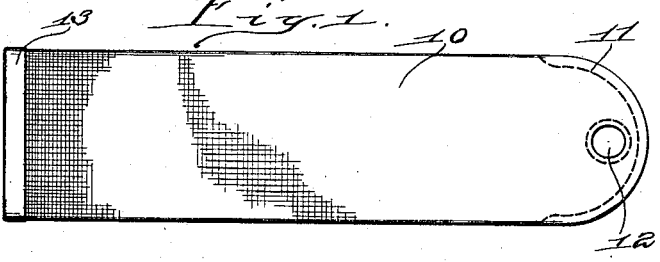
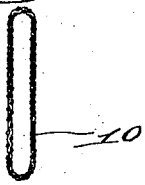
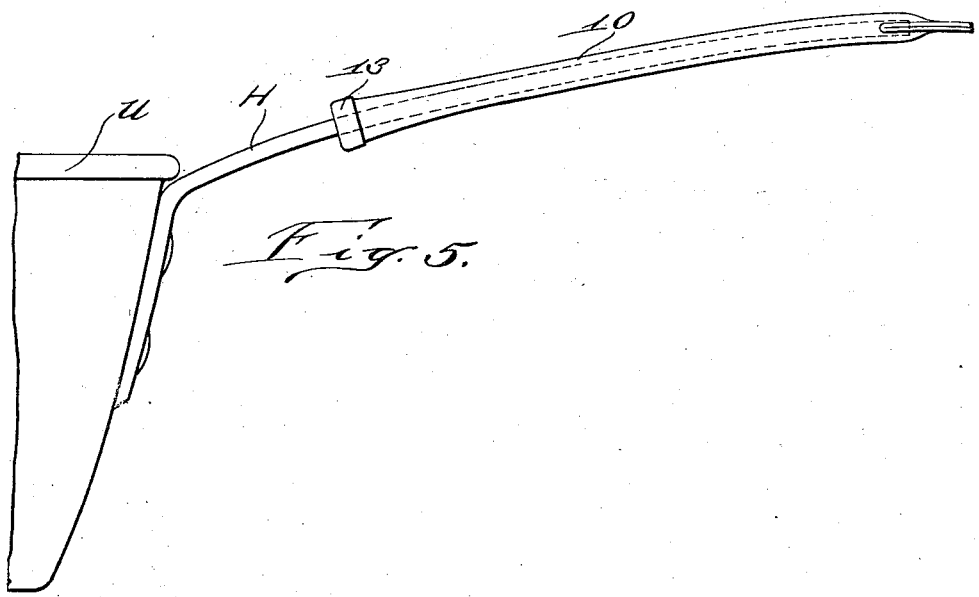
Inventor:
Philip F. Martus
By Clyde L. Rogers
his Atty.

Patented Mar. 25, 1924.

1,487,749

UNITED STATES PATENT OFFICE.

PHILIP F. MARTUS, OF SOUTH BOSTON, MASSACHUSETTS.

HOT-HANDLE GRIP.

Application filed April 14, 1922. Serial No. 552,696.

*To all whom it may concern:*

Be it known that I, PHILIP F. MARTUS, a citizen of the United States, and resident of South Boston, county of Suffolk, Commonwealth of Massachusetts, have invented an Improvement in Hot-Handle Grips, of which the following description, in connection with the accompanying drawings, is a specification, like characters on the drawings representing like parts in each of the several views.

This invention relates to protective hand grips for handles of articles such as ordinary cooking utensils, wherein it is desirable to provide a simple and easily applied device for protecting the hand from the heat of the handle,—the invention being particularly adapted for use on metallic handles of cooking pans and receptacles. The foregoing and other objects and advantages of the invention will more fully appear from the following detailed description taken in connection with the accompanying drawings, and the distinctive features of novelty will be pointed out in the appended claims.

Referring to the drawings:

Figure 1 is a plan view of a hot handle grip embodying the invention;

Figure 2 is an end view thereof looking from the left in Figure 1;

Figure 3 is an edge view of the device;

Figure 4 is a transverse section on line 4—4 of Figure 3; and

Figure 5 is a view showing the application of the invention to the handle of a cooking utensil.

In carrying out my invention I provide a flexible tubular member 10 that may be woven of asbestos or other non-heat conductive fibrous material. This is produced of a length and transverse dimension adapting it to be slipped over the largest size of cooking utensil handle H ordinarily found in use, or for which the device may be intended. This tubular woven member is shown as having one end thereof closed by a suitable clip 11 and provided with an eyelet 12 adjacent its closed end, by which it may be hung up when not in use. The other and open end of this member is preferably equipped with a metallic ferrule 13 of relatively thin easily distorable metal. In use the protective sleeve 10 is slipped over the handle H of the cooking or other utensil U as indicated in Figure 5. Then the ferrule 13 may be pressed down around the handle so as to frictionally engage the same and preventing causual slipping off of the device while permitting it to be easily removed when desired. While I prefer to make the protective sleeve of woven asbestos on account of its relatively high heat insulating property, I do not desire to be limited to this particular material, since textile fabrics such as of cotton or wool may be employed. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A hot handle grip comprising a flexible tubular sleeve of non-heat-conductive fibrous material adapted to be fitted over the handle of a household utensil, having one end thereof closed and a distortable metallic ferrule borne by the other end thereof adapted to be pressed down upon the utensil handle to frictionally embrace the same.

2. A hot handle grip comprising a flexible tubular sleeve of asbestos or the like closed at one end and equipped with an eyelet, and having its other end open and bearing a distorable metallic ferrule adapted to be pressed down upon the utensil handle to frictionally embrace the same.

3. A hot handle grip, comprising a flexible tubular sleeve of non-heat-conductive fibrous material adapted to be fitted over the handle of a household utensil, and equipped with means adapted for permanent distoration to be pressed down upon the utensil handle to frictionally engage the same, said sleeve closed and equipped with an eyelet at one end for the purpose stated.

In testimony whereof, I have signed my name to this specification.

PHILIP F. MARTUS.